United States Patent [19]

Carmeli

[11] Patent Number: 5,699,440
[45] Date of Patent: Dec. 16, 1997

[54] METHOD AND SYSTEM FOR TESTING THE PERFORMANCE OF AT LEAST ONE ELECTRO-OPTICAL TEST DEVICE

[75] Inventor: Ran Carmeli, Petach-Tikva, Israel

[73] Assignee: Genop Ltd., Beer-Sheva, Israel

[21] Appl. No.: 352,165

[22] Filed: Dec. 1, 1994

[30] Foreign Application Priority Data

Dec. 2, 1993 [IL] Israel ........................ 107835

[51] Int. Cl.⁶ ............................ G06K 9/00; G01M 11/00
[52] U.S. Cl. ........................ 382/100; 356/124; 348/180; 364/551.01
[58] Field of Search .................... 356/124, 124.5; 348/175, 176, 180, 184, 187, 188, 189, 190; 382/100, 141, 275; 364/551.01; 359/249, 307

[56] References Cited

U.S. PATENT DOCUMENTS

| | | | |
|---|---|---|---|
| 3,552,288 | 1/1971 | Corley | 348/187 |
| 3,938,892 | 2/1976 | Klingman | 356/124.5 |
| 4,060,328 | 11/1977 | Flynt | |
| 4,274,737 | 6/1981 | Howland | 356/124.5 |
| 4,316,211 | 2/1982 | Mackey et al. | |
| 4,454,541 | 6/1984 | Duschl | 348/125 |
| 4,491,868 | 1/1985 | Berridge, Jr. et al. | |
| 4,513,319 | 4/1985 | Breimer et al. | |
| 4,558,462 | 12/1985 | Horiba | 382/275 |
| 4,575,124 | 3/1986 | Morrison | 348/188 |
| 4,582,427 | 4/1986 | Hutchin | 356/124.5 |
| 4,586,817 | 5/1986 | Ehemann, Jr. | |
| 4,608,593 | 8/1986 | Miyaji et al. | |
| 4,628,342 | 12/1986 | Desmons | 348/188 |
| 4,628,360 | 12/1986 | Mook | 348/193 |
| 4,641,963 | 2/1987 | Levine | 356/124.5 |
| 4,760,447 | 7/1988 | Koka | 348/184 |
| 4,767,215 | 8/1988 | Borodovsky | 356/124 |
| 4,772,120 | 9/1988 | Pointeau | 356/124.5 |
| 4,866,644 | 9/1989 | Shenk | 356/124 |
| 4,951,141 | 8/1990 | Fischer | |
| 4,962,425 | 10/1990 | Rea | 348/187 |
| 4,963,828 | 10/1990 | Kawame | 348/180 |
| 4,989,072 | 1/1991 | Sato | 348/180 |
| 4,991,007 | 2/1991 | Corley | |
| 5,033,015 | 7/1991 | Zwirn | 348/187 |
| 5,075,883 | 12/1991 | Friedman | 356/124.5 |
| 5,140,418 | 8/1992 | Rivamonte | |
| 5,157,501 | 10/1992 | No | 348/294 |
| 5,179,437 | 1/1993 | Kawada | 348/188 |
| 5,257,092 | 10/1993 | Noguchi | 356/124 |
| 5,327,226 | 7/1994 | Tanabe | 348/188 |
| 5,351,201 | 9/1994 | Harshbarger | 348/187 |
| 5,404,164 | 4/1995 | Hassler | 348/188 |

FOREIGN PATENT DOCUMENTS

| | | |
|---|---|---|
| 0084195 | 12/1982 | European Pat. Off. . |
| 0092465 | 4/1983 | European Pat. Off. . |

OTHER PUBLICATIONS

P.R. Groves, "The Use Of Automatic Techniques To Improve Colour Camera Picture Quality", pp. 373–382, 28 May 1983 –2 Jun. 1983 Montreux (CH).

*Primary Examiner*—Dwayne Bost
*Assistant Examiner*—Brian Johnson
*Attorney, Agent, or Firm*—Browdy and Neimark

[57] ABSTRACT

A method and system for testing the performance of at least one electro-optical test device, comprising constructing an electro-optical system having a light source, a test target, a lens and an imaging device as required in combination with the test devices. A respective identity code of a plurality of precalibrated devices together with corresponding electro-optical performances are stored in a database and the imaging device is aligned to the test target so as to produce a focused image thereof. Pre-calibbrated devices are selected from the database and the focussed image is digitized and stored so as to produce a digitized image which is analyzed so as to determine an electro-optical performance representative of the performance of the electro-optical system which is equal to the product of component electro-optical performances of each of the electro-optical test devices and each of the additional pre-calibrated devices. This permits determination of the product of component electro-optical performances of each of the electro-optical test devices.

16 Claims, 10 Drawing Sheets

METHOD AND SYSTEM FOR TESTING THE PERFORMANCE OF AT LEAST ONE ELECTRO-OPTICAL TEST DEVICE

FIELD OF THE INVENTION

This invention relates to a system for examining electro-optical components and systems.

BACKGROUND OF THE INVENTION

Notwithstanding the ever increasing use of electro-optical components, there is no simple way in which the performance of each of the components in an electro-optical system, as well the performance of the complete systems cart be tested. Thus, to the extent that it is required to test the performance of a complete electro-optical system or of particular subcomponents thereof, such testing is often highly subjective as well as time-consuming.

Various prior art systems relate to the setup and calibration of specific optical components within a pre-calibrated optical system. For example, U.S. Pat. No. 4,316,211 (Mackey et al.) discloses a convergence measuring apparatus for use with a color television kinescope and deflection yoke comprising means for activating two of the electron beams of the kinescope to generate a convergence test pattern on the kinescope display screen. The convergence test pattern is a set of alternating color patches. The degree of overlap and gap between patches is indicative of the degree of beam misconvergence. A monogram television camera observes the test pattern and provides a signal to a signal processor which controls the electron beam activating means to move one color patch with respect to the other color patch so as to reduce the gap and overlap between patches. A measurement of the amount of patch movement necessary to minimize the overlap and gap between patches is an indication of electron beam misconvergence in the vicinity of the test pattern.

Whilst such a system permits the electron beam misconvergence to be minimized, the resulting optical performance of the system is not susceptible to measurement.

U.S. Pat. No. 4,513,319 (Breimer et al.) shows in FIG. 1 a lens system 4 and a pick-up arrangement or camera 5. Two test patterns are used, a flip-up internal test pattern 18 and an external test pattern 1. Information associated with the internal test pattern is subtracted from correction information associated with the external test pattern, and the resulting correction difference is stored in a lens memory. The camera memory and lens memory together produce a correction, which is related to a measure of aberration. An auxiliary memory is provided for storing data associated with the external test pattern. A lens memory which stores data corresponding to particular lenses is also disclosed.

In use, a test chart is imaged by the television camera to which may be coupled different lenses, the characteristics of which are pre-calibbrated and stored in the lens memory. The calibration is effected by means of an external test pattern which is positioned in front of the camera. The difference between the correction information associated with the different lens systems and determined by means of the external test pattern, and the correction information associated with the internal test pattern is stored by the supplier in the respective digital lens memory. As a result, each lens system has its own lens memory with correction information stored therein:

For setting up the camera during preparation for scene recording, the camera operator places the lens memory associated with the lens system in the camera or chooses one of the incorporated memories to block the optical path containing the lens system, and positions the test pattern present in the camera in the illuminated optical path in order to make the automatic setup operative.

Such a system provides for automatic setup of a television camera with a plurality of pre-calibrated lens systems. However, no provision is made for altering other components in the optical system such as, for example, the test target or the light source.

U.S. Pat. No. 4,951,141 (Fischer) shows a method of determining the transmission function of a video camera. A bar pattern is taken in which the width of the bars is selected to be sufficiently small so that their influence on the amplitude and phase response of the electrical pulse which is produced upon scanning of a bar in the camera is negligible. The narrow electrical pulses thus produced at the output of the video camera are selected and subjected to Discrete Fourier Transformation.

Such a system permits evaluation of monochrome cameras only and requires a fixed apparatus none of whose components is amenable to substitution.

U.S. Pat. No. 4,491,868 (Betridge, Jr., et al.) shows a video image compensator for inspecting objects. The compensator compares two images which have been digitized. Two memories are employed: an image memory and a memory in which digitized data corresponding to a workpiece of known quality are stored and which may also store test pattern data.

The apparatus disclosed by Berridge does not allow for testing the camera per se but merely corrects for deviations or aberrations within the camera. Furthermore, the system is suitable for use with vidicons only and again requires a fixed apparatus.

U.S. Pat. No. 4,586,817 (Ehemann, Jr.) discloses a CRT having a screen which is imaged by a lens. At the image plane, a photo detector is scanned back and forth across the image. The light variations are converted to electronic signals for producing an alternating image signal permitting derivation of the MTF (Modular Transfer Function) from the image signal. The apparatus disclosed by Ehemann uses a photo detector and is fixed, i.e. does not permit components thereof to be interchanged. Moreover, the apparatus permits only the value of MTF to be derived and not any other property of the optical system.

U.S. Pat. No. 4,991,007 (Corley) discloses a system and a method for evaluating a visual image characteristic, such as the brightness, color, tonal scale, geometric linearity, sharpness and/or position of an electronic image signal, such as obtained from a television camera. A camera views a test object so as to produce camera signals which are sent to an image combiner which also receives signals from a signal generator. A combination image is displayed on a display monitor. In operation, the camera is aimed at the test pattern device and a signal representing an image of the test target is passed to the image combiner and then to the monitor. Simultaneously, the reference signal generator generates a reference image signal representing a reference image having a predetermined visual appearance for the same visual image characteristic or characteristics as that or those of the test target. The reference image signal is generated using known formulae relating values of the selected visual image characteristic to specific output signal voltage levels.

The image combiner combines the signal from the camera with the reference image signal and passes the resulting combined signal to the monitor on which the two images are thus displayed in juxtaposition thereby permitting an observer to discern differences in the desired visual image characteristic between any individual portion of the two images.

Such a system permits visual inspection by an operator and permits a visual comparison to be made between the actual image signal produced by a television camera and a reference test signal. However, the comparison itself is substantially subjective and no absolute calibration of the television camera is thus provided. Furthermore, the electro-optical system is fixed and no provision is made for substituting component devices thereof or for evaluating the performance of different sub-components of the system.

SUMMARY OF THE INVENTION

It is an object of the invention to provide a method and system for testing a performance of an electro-optical system and/or of a component thereof, which provides greater accuracy and ease of measurement than provided in hitherto proposed methods and systems.

According to a first aspect of the invention there is provided a method for testing the performance of at least one electro-optical test device, comprising the steps of:

(a) coupling to said at least one electro-optical test device additional pre-calibrated devices as required so as to construct an electro-optical system having a light source, a test target, a lens and an imaging means, (b) storing a respective identity code of a plurality of pre-calibrated devices together with corresponding electro-optical performances, (c) aligning the imaging means to the test target so as to produce a focused image thereof, (d) specifying which devices, if any, in said electro-optical system are pre-calibrated, (e) digitizing and storing the focussed image so as to produce a digitized image, (f) analyzing the digitized image so as to determine an electro-optical performance representative of the performance of the electro-optical system and being equal to the product of component electro-optical performances of each of said at least one electro-optical test device and each of said additional pre-calibrated devices, and (g) determining the product of component electro-optical performances of each of said at least one electro-optical test device.

According to a second aspect of the invention there is provided a system for testing the performance of at least one electro-optical test device, the system comprising:

an electro-optical system including said at least one electro-optical test device coupled to additional pre-calibrated devices as required, said electro-optical system comprising a light source, a target, a lens and an imaging means, a computer coupled to the electro-optical system and including a memory for storing therein a database of pre-calibrated device identity codes and corresponding electro-optical performances thereof, optical alignment means coupled to the electro-optical system and to the computer for permitting alignment of the electro-optical system and producing an indication signal when the electro-optical system is correctly aligned, a setup means for specifying the identity codes of each of the pre-calibbrated devices in said electro-optical system, a digitizing means coupled to the electro-optical system for digitizing an image produced by the electro-optical system and being coupled to said memory for storing therein a corresponding digitized image, an analysis means coupled to the memory for determining an electro-optical performance representative of the performance of the electro-optical system and being equal to the product of component electro-optical performances of each of said at least one electro-optical test device and each of said additional pre-calibrated devices, said analysis means further for determining the product of component electro-optical performances of each of said at least one electro-optical test device.

Preferably, the system according to the invention operates under computer control and provides a menu driven interface permitting different functions of the video device under test to be quantified.

BRIEF DESCRIPTION OF THE DRAWINGS

In order to understand the invention and to see how the same may be carried out in practice, a preferred embodiment will now be described, by way of non-limiting example only, with reference to the accompanying drawings, in which.

DETAILED DESCRIPTION OF PREFERRED EMBODIMENTS

Figure 1A:
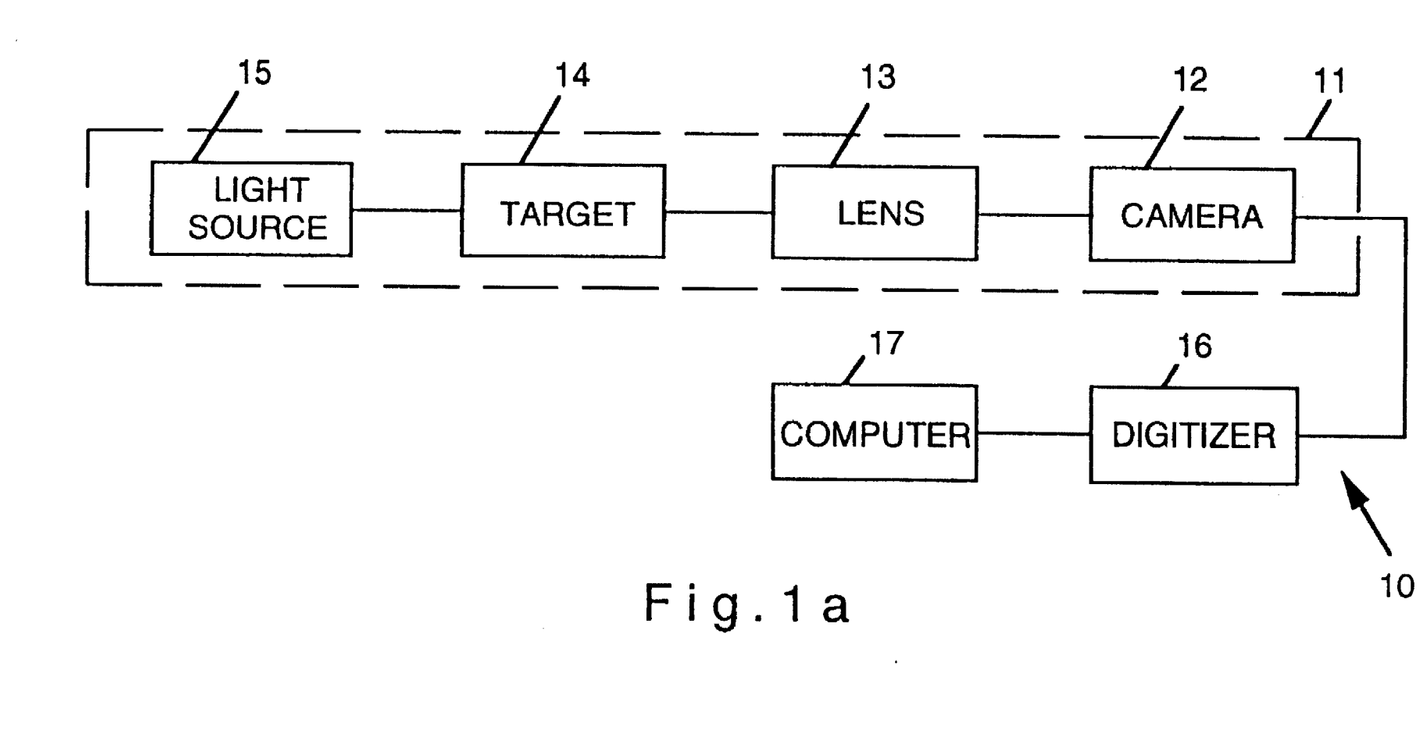
FIGS. 1a and 1b are block diagrams showing functionally the principal elements in alternative systems according to the invention.

FIG. 1a is a block diagram showing functionally a system 10 according to the invention for testing a performance of a device for use with an electro-optical system 11, in accordance with a first embodiment of the invention.

The electro-optical system 11 is constructed from high performance and pre-calibrated components in conjunction with the device to be tested. The electro-optical system 11 includes a video camera 12, a lens 13, a target 14 and a light source 15, one of these being the test device and all the others being high performance, pre-calibrated components. The electro-optical system 11 is coupled to a digitizer 16 which itself is coupled to a computer 17 including a memory (not shown) for digitizing and storing the image formed by the electro-optical system 11. The computer 17 includes an analysis unit (not shown) for analyzing the performance of the electro-optical system 11 and, in particular, of the test device therein.

In use, an image is produced by the camera 12 and the image is digitized by the digitizer 16 and stored in the memory of the computer 17. Owing to aberrations associated with the test device, the image is distorted compared with a theoretical ideal image which would be obtained if the test device were replaced by an equivalent high performance device. It is therefore possible to evaluate the performance of the test device relative to an equivalent high performance, pre-calibrated device.

In the system 10 shown in FIG. 1a, the electro-optical system 11 does not include a display device and thus, apart from the camera 12, the principal components of the electro-optical system 11 comprising the light source 15, the target 14 and the lens 13 are all standard optical components mounted on a conventional optical bench. In order to evaluate the test performance of the complete optical system comprising the lens 13, the target 14, and the light source 15, it is necessary that the camera 12 be pre-calibbrated in respect of at least one desired electro-optical performance. The combined electro-optical performance of the complete electro-optical system 11 is then the product of the electro-optical performance of the camera 12 and of each of the optical components constituted by the lens 13, the target 14 and the light source 15. If the corresponding electro-optical performances of any of these components are themselves known, then the product of the electro-optical performances of any remaining uncalibrated devices may be determined. For example, if the electro-optical performances of the camera 12, the target 14 and the light source 15 are all known, then the electro-optical performance of the lens 13 may be evaluated. Such evaluation is numerical and objective and does not require any empirical assessment on the part of an operator nor qualitative interpretation thereby.

Figure 1B:
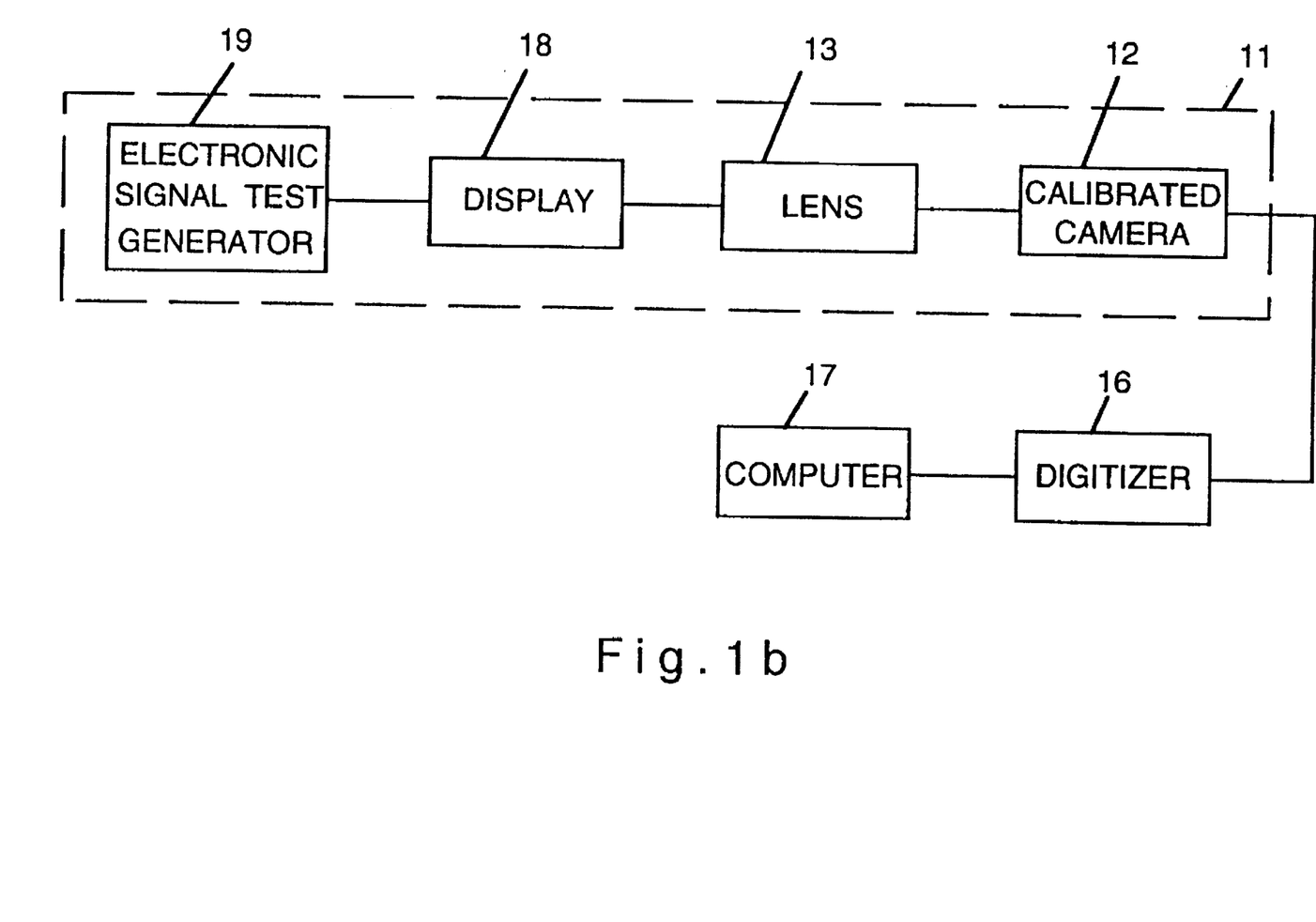

FIG. 1b shows a second embodiment of the invention wherein it is desired to test the performance of a display device 18. To this end, the electro-optical system 11 comprises an electronic signal test generator 19 coupled to the display device 18 which in turn is imaged by a calibrated camera 12 through a calibrated lens 13. The calibrated camera 12 is coupled to the digitizer 16 and the computer 17 as described above with reference to FIG. 1a of the drawings. In such a system, the electronic signal test generator 19 replaces the target 14 and the light source 15 shown in FIG. 1a for producing a video image signal which is displayed by the display device 18 whose screen is imaged by the calibrated camera 12 so as to produce a video image which is evaluated in an identical manner to that described above with reference to FIG. 1a of the drawings.

Preferably, the computer 17 contains a menu-driven program for controlling the analysis unit therein, whereby different tests may be performed so as to evaluate different performance parameters of the electro-optical system 11.

For example, the analysis unit may determine the Modular Transfer Function or the Contrast Transfer Function of the lens 13. Likewise Grey Level Linearity Illumination Uniformity and Geometrical Distortion of the system may be determined as may other tests well known in the art. In this connection, it will be appreciated that the performance of an electro-optical system comprising several sub-components, is a function of the performance of each sub-component thereof. Moreover, the performance parameters are linear, such that, for example, the MTF, CrF or Grey Level Linearity of the complete system is merely the product of the respective parameter for each of the sub-components in the complete system.

The Signal-to-Noise ratio for the complete system may likewise be determined by applying a signal of known strength and measuring the noise for each sub-component, bearing in mind that:

$$N^2_{(complete\ system)} = \sum_1^n N^2_{(n^{th} component)} \tag{1}$$

Consequently, since all the sub-components in the electro-optical system 11 apart from the device or devices under test are pre-calibrated, the performance of the test device or devices may be evaluated based on the linear relations described above.

Figure 2A:
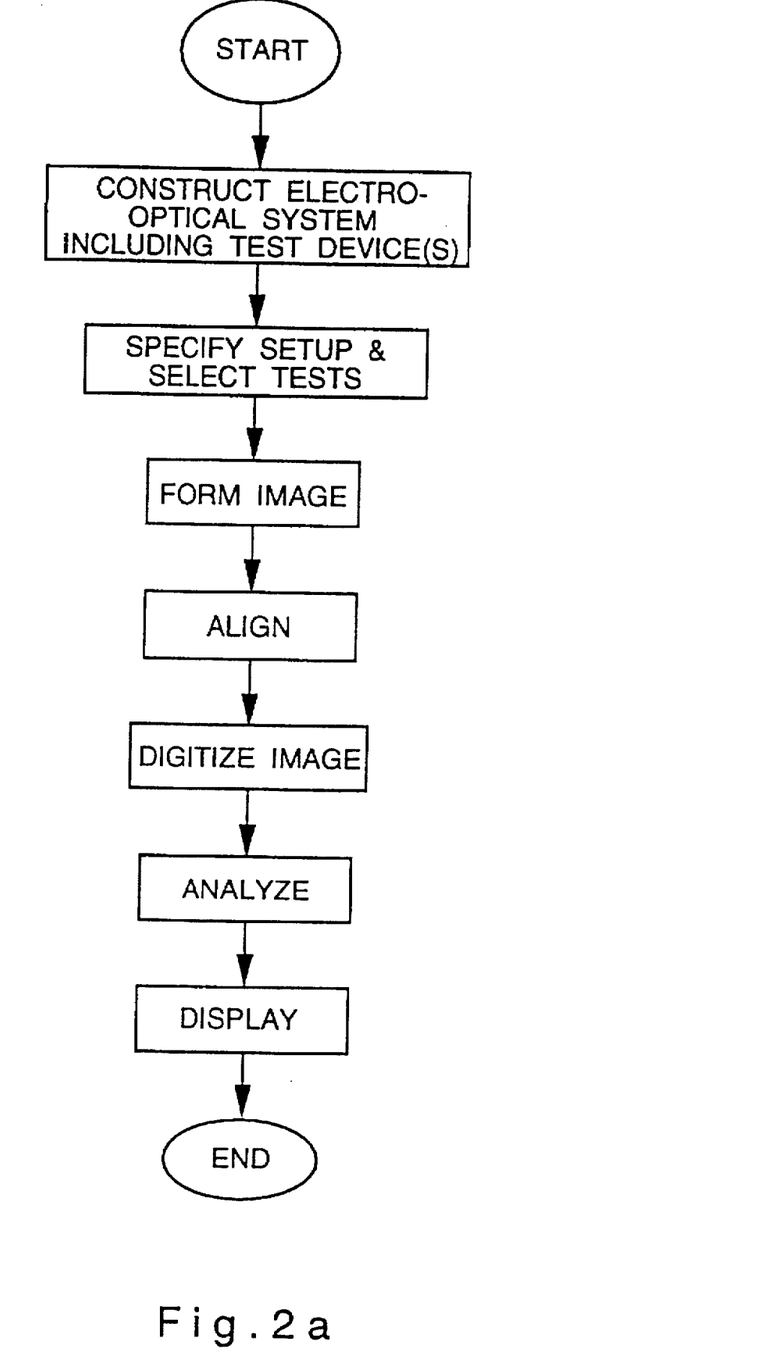
FIG. 2a is a flow diagram showing the principal operating steps in a method according to the invention.

Reference is now made to FIG. 2a of the drawings showing the principal operating steps in a method according to the invention for evaluating the test performance of the electro-optical system 11 shown in FIGS. 1a and 1b. Within the memory of the computer 17 there is stored a database of pre-calibrated components permitting representative electro-optical performances thereof to be stored and also permitting storage of various physical characteristics of each device, such as physical dimensions, which are necessary for proper alignment of the electro-optical system. The electro-optical system 11 is then constructed by coupling the test device or devices to standard components for which the calibration data is stored in the database. Under control of software stored in the computer 17, the required setup is specified by selecting from the database the corresponding standard, pre-calibrated components whose physical and optical data are thus known. An image is formed and is aligned so as to produce sharp focus and correct for optical magnification so that the target is correctly aligned to the lens and camera.

Thereafter, the resulting image is digitized and analyzed so as to determine the required electro-optical performances of the complete system. Since the calculated electro-optical performance is a product of the corresponding electro-optical performances of each of the component devices in the electro-optical system, and since moreover the corresponding electro-optical performances of the pre-calibrated components are known, the resulting electro-optical performance of the test device or the product of the electro-optical performances of the test devices may easily be determined and displayed, as required, on a display monitor (not shown) coupled to the computer 17.

Owing to the setup procedure, any standard calibrated electro-optical component can be substituted for corresponding devices in the electro-optical system, re-alignment can be effected and the analysis can be performed again as required. Much more significant, however, is the reverse situation whereby analysis can be performed with the specific, limited range of components typically available to the end user who needs to correlate the analysis software within the computer 17 to the range of components actually in his possession. With the prior art systems discussed in the opening section of the specification this is not possible because the only degree of freedom is the TV camera under test.

However, the database and related setup of the invention allows for much greater flexibility since it enables the analysis software to respond to the actual components in use rather than requiring the reverse: namely that the components be selected to suit the software. It is, of course, a feature of the invention that the database can be updated and modified by the end user so as to add new components and amend the optical and mechanical data relating to existing components as required. However, since there is no novelty in the database structure per se and databases are well known in the art, no further details are considered necessary.

Figure 2B:
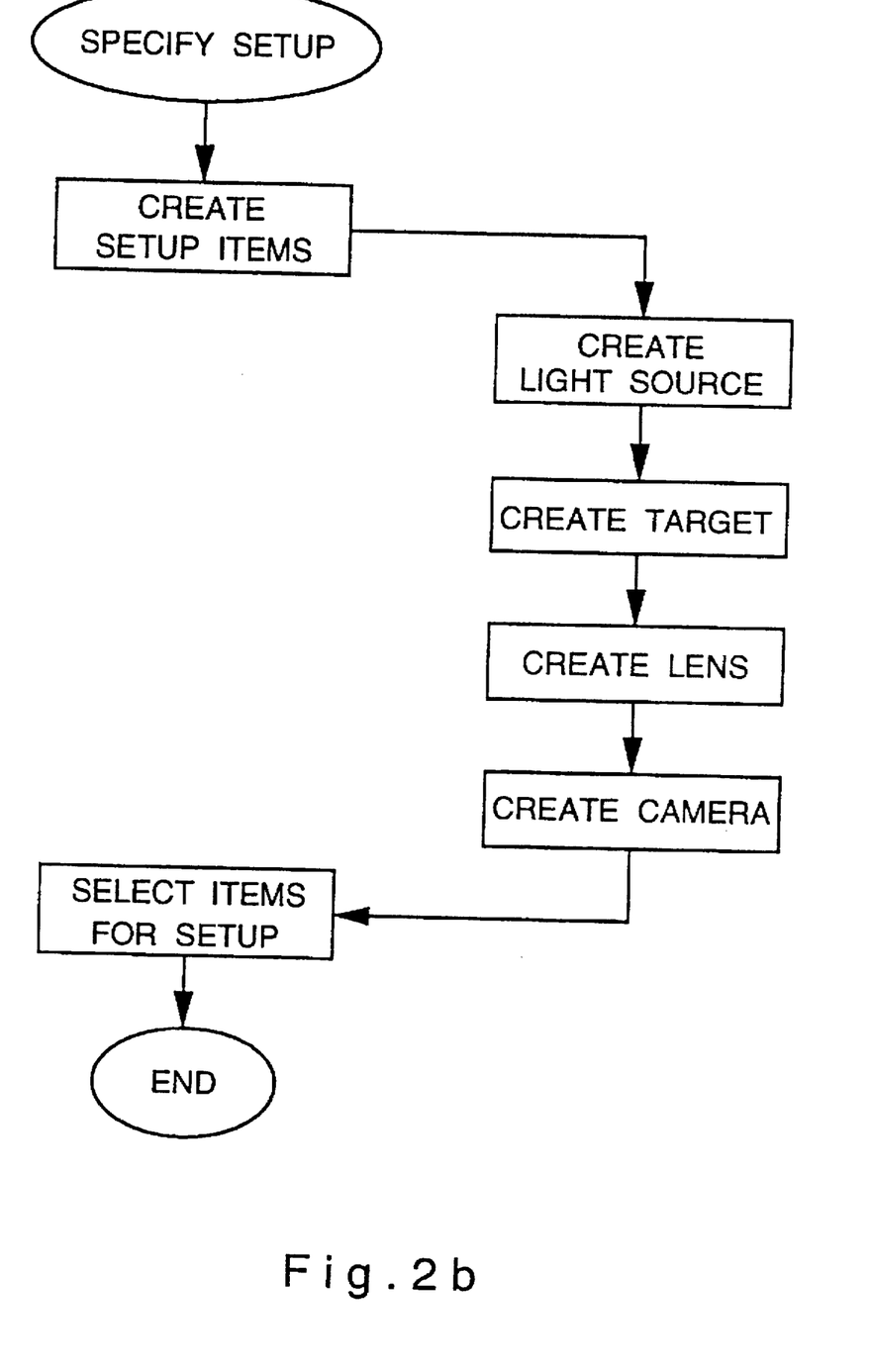
FIGS. 2b and 2c are flow diagrams showing the principal operating steps in a setup procedure for defining the systems of FIGS. 1a and 1b, respectively.

FIG. 2b shows the principal operating steps relating to a setup procedure for the configuration described above with reference to FIG. 1a of the drawings. The setup procedure contemplates creating a database containing all of the relevant parameters for the electro-optical components used in the test measurement. As shown in FIG. 2b, this is done for the light source, the target, the lens and the camera. In practice, the database contains parameters for many different light sources, a large range of targets permitting a correspondingly wide range of different measurements to be performed, different lenses and different cameras so that, regardless of the actual electro-optical system under test, corresponding parameters are stored in the database for each component therein. Then, as shown in the Figure, during the setup procedure, the appropriate items are selected.

Figure 2C:
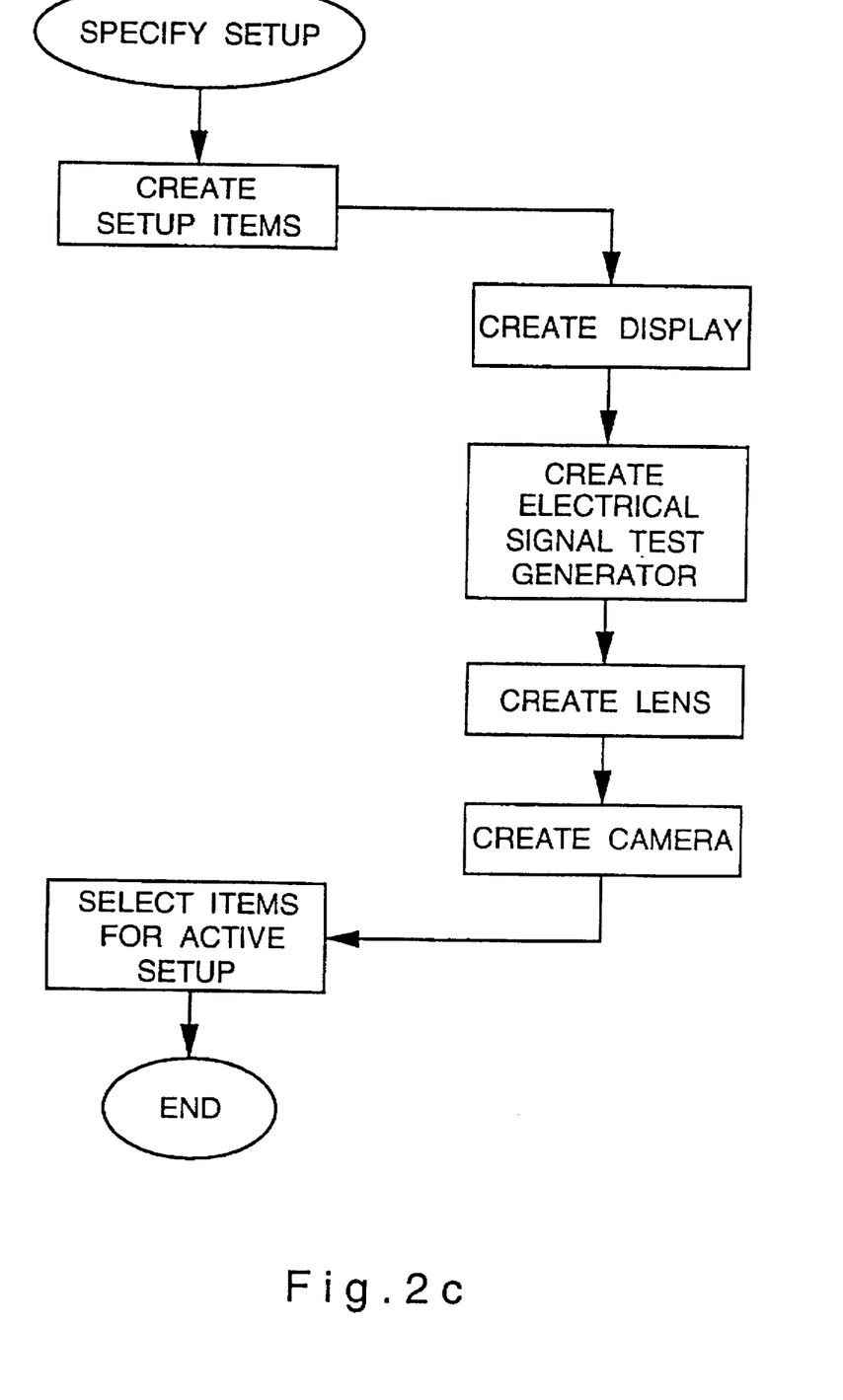

FIG. 2c is a flow diagram of the corresponding setup procedure for the configuration described above with reference to FIG. 1b of the drawings. In this case, provision must be made for defining different display devices and electrical signal test generators for storage in the database. Thereafter, the appropriate components are selected from the database, corresponding to the actual electro-optical components under test.

Figure 2D:
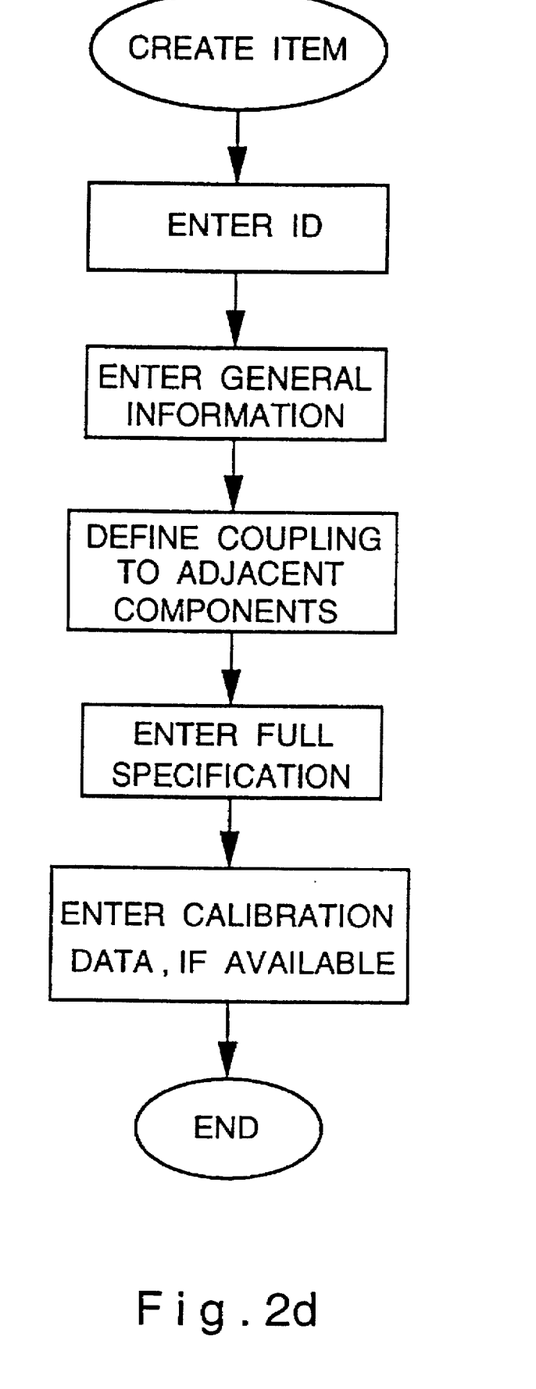
FIG. 2d is a flow diagram showing a detail of the setup procedures illustrated in FIGS. 2b and 2c relating to the creation of new item in a database of standard electro-optical components.

As shown in FIG. 2d of the drawings, if a component is present in the electro-optical system which has no corresponding entry in the database, then a new item must be created corresponding to the missing component. In this case, a database record is created including an identification name, general information as required, and data indicating how the component is coupled to adjacent components. Such data is an inherent part of the components specification and for a camera and lens, for example, might include the following parameters:

Camera parameters:

size of image (½", ⅔", 1" or other);

Standard (EIA, CCIR, PAL, NTSC etc.);

Number of pixels in horizontal and vertical directions;

Type of imager (CCD, CID, Tube, etc.);

Pixel size;

Lens specification:

Type of item (Lens, microscope objective);

Focal length or magnification;

Useful magnification range;

Calibration data (if available): MTF, CTF and so on.

Other forms of imaging device may be employed such as, for example, super-sensitive Low Light Level TV cameras (LLLTV), for which the same approach can also be used. Likewise reticles are classified according to similar parameters.

In addition, for each item, a full and detailed specification is entered the stored parameters being different for each different type of component and being sufficient to permit the various electro-optical performances to be calculated for each component. Finally, any known calibration data is entered for the item and, if not known, this information is merely left blank.

In order more readily to appreciate how the database is set up, a simple example will now be provided showing the determination of the center MTF horizontal performance of an electro-optical system. A setup data file DEM-SET is created specifying the following parameters:

Tested device: camera ID: DEM-CAM

Reticle: (calibrated) ID: DEM-RTC

Optics: (calibrated) ID: DEM-OPT

Light source (calibrated) ID: DEM-LHT

The above-specified data files contain at least the following parameters:

Camera:

ID: DEM-CAM

Imager size:

Standard: EIA

No. of pixels: 752 H 581 V

Type of imager: CCD

Pixel size: 10 μm×11

Reticle:

ID: DEM-RTC

General dimensions: 26×19 mm

Measurement patterns information:

Optics:

ID: DEM-OPT

Type of item: Lens

Focal length: 60 mm

TABLE I

| Reticle Pattern Data | | | | |
| --- | --- | --- | --- | --- |
| Top Left | | Bottom Right | | Trans- |
| x | y | x | y | parency |
| White Level  0 | 0 | 20 | 20 | 100 |
| Black Level  20 | 20 | 40 | 40 | 0 |
| MTF Edge  40 | 40 | 60 | 60 | — |

Active aperture: 5.6

Useful magnification range: ×1 to ×200

Calibration data: Diffraction limit

Light source:

ID: DEM-LHT

Type: Quartz halogen

Recommended power supply: 12 V d.c.

Color temperature: 2850° K.

Having now entered the above data into the database, it is now possible to determine the Modular Transfer Function (MTF) for the electro-optical system by selecting MTF from the "measurements menu". The system calculates the magnification M according to the equation:

$$M = \frac{264}{8.8}$$

where:

264=the width of the reticle in mm, and
8.8=the width of the ⅔" standard CCD in mm.

Having determined the magnification, the coordinates of the measurement pattern as imaged on the CCD may now be determined by proportion from the reticle data shown in Table I above. The calculations yield the following results:

TABLE II

Measurement Patterns on CCD

| | Top Left | | Bottom Right | | Trans- |
|---|---|---|---|---|---|
| | x | y | x | y | parency |
| White Level | 0 | 0 | 0.666 | 0.666 | 100 |
| Black Level | 0.666 | 0.666 | 1.333 | 1.333 | 0 |
| MTF Edge | 1.333 | 1.333 | 2 | 2 | — |

Thus, on the basis of the calibration data in the database shown in Table I, the system calculates the coordinates on the CCD with respect to an origin thereof, typically the top left hand corner. These coordinates must now be converted to equivalent serial video signals based on the number of the CCD scan line corresponding to each y location and the scan time, $\Delta t$, to reach each x location. The conversion is also dependent on the CCD calibration data stored in the database, according to the following formulae:

$$TV_{line} = \left( \frac{y|_{CCD}}{6.6} \times 242 \right) + 20 \quad (3)$$

$$\Delta t = \left( \frac{x|_{CCD}}{8.8} \times 52.8 \, \mu s \right)$$

wherein:

242 is the number of active TV lines in the video field of the EIA standard;

20 is the number of video lines in the vertical sync of the EIA standard;

6.6 is the height in mm of the ⅔" standard CCD;

8.8 is the width in mm of the ⅔" standard CCD; and 52.8 is the line time for the EIA standard.

The computed results constitute the input for the MTF algorithm described below with reference to FIGS. 7a and 7b and equations (5) and (6).

FIGS. 3 to 15a show different reticles 20 to 22 for use with the target 14 shown in FIGS. 1a and 1b and which are used in order to evaluate different performance parameters of the lens 13.

Figure 3:
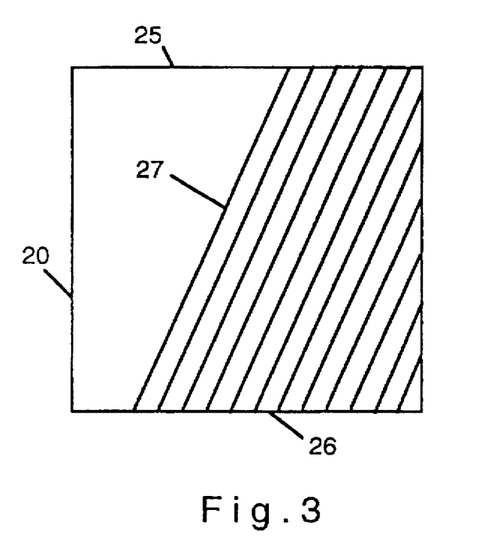
FIGS. 3 to 5 are pictorial representations of reticles for use with the system shown in FIG. 1.

Thus, FIG. 3 shows a test pattern comprising a clear section 25 and a black section 26 separated by a sloping edge 27. In such a pattern, the Fourier transform of the differential of the edge pattern is equivalent to a sinusoidal pattern. However, continuous frequencies are given as opposed to discrete frequencies which do not exist.

Figure 4:
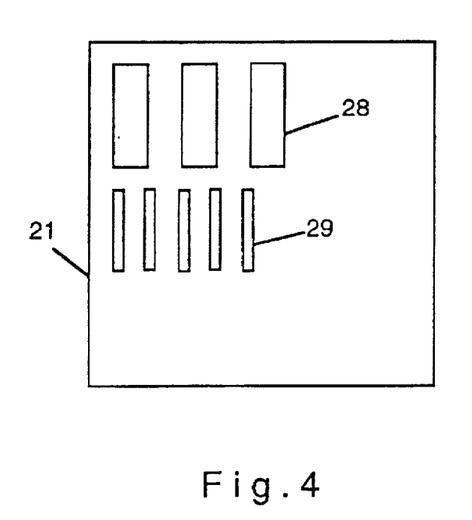

In FIG. 4 the reticle 21 is provided with different patterns 28 and 29 comprising vertical bars having different spacings. The different patterns permit the Contrast Transfer Function of a lens to be determined at different frequencies.

Figure 5:
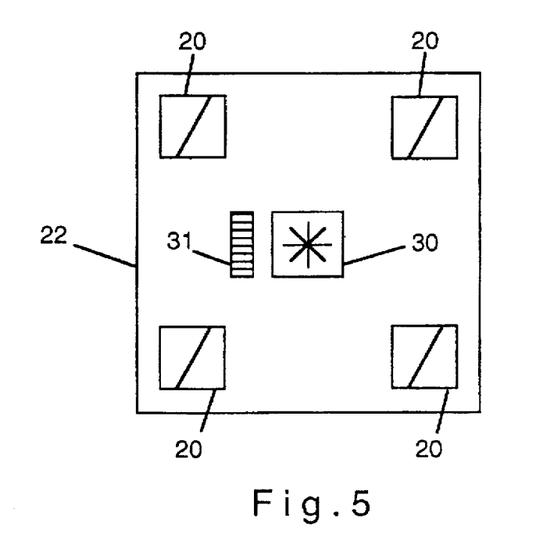

FIG. 5 shows a reticle 22 having a variety of patterns disposed in different areas of the reticle 22. Thus, at each corner there is provided a reticle 20 of the type shown in FIG. 3. In the center is a single cross 30 for measuring the Modular Transfer Function of a lens at its center whilst disposed around the cross 30 are other patterns such as the pattern designated as 31 comprising a plurality of contiguous areas having different grey levels for performing Grey Level tests.

With reference to FIGS. 6a and 6b to 12, specific features of the reticle 22 will now be described for determining some of the most common parameters characterizing an electro-optical system.

Figure 6A:
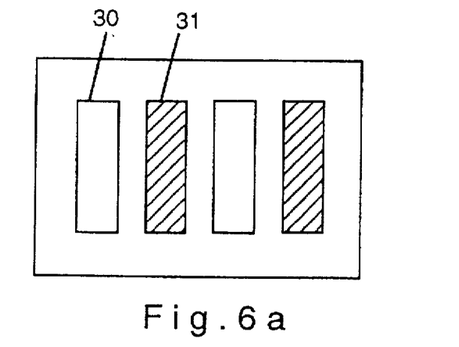
FIGS. 6a and 6b are schematic representations showing, respectively, a detail of a reticle and a corresponding output signal for determining a CTF for the system.
Figure 6B:
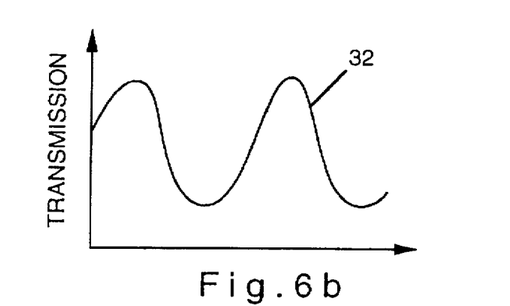

Thus, FIG. 6a shows schematically, an area of the reticle 22 having thereon adjacent transparent and opaque lines, 30 and 31, respectively, in different spatial frequencies. If the performance of such a reticle were perfect, then the transmission of the transparent lines 30 would be 100% whilst that of the opaque lines 31 would be zero. In fact, as shown in FIG. 6b, an output signal 32 is produced by the video camera whose upper peak value corresponding to less than 100% transmission and whose lower peak value corresponds to greater than zero transmission.

Denoting, the maximum and minimum values of the output signal 32 as $S_{Max}$ and $S_{Min}$, respectively, and the actual transparent and opaque transmission levels as $T_t$ and $T_o$, respectively, the Contrast Transfer Function (CTF) may be calculated, as follows:

$$CTF_{(v)} = \frac{S_{Max} - S_{Min}}{T_t - T_o} \quad (4)$$

Figure 7A:
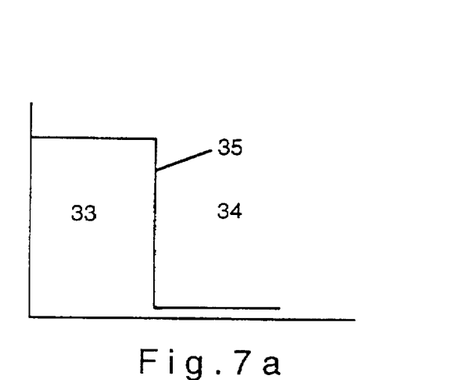
FIGS. 7a and 7b are schematic representations showing, respectively, a detail of a reticle and a corresponding output signal for determining a MTF for the system.
Figure 7B:
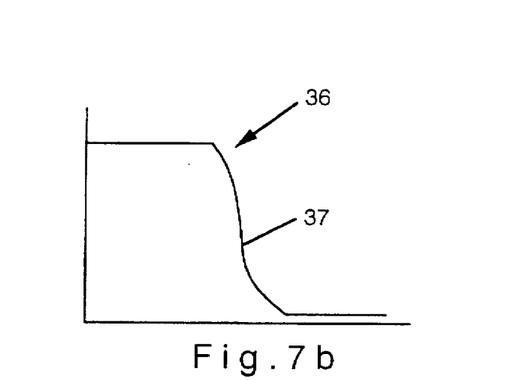

FIG. 7a shows schematically, an area of the reticle 22 having thereon adjacent transparent and opaque areas 33 and 34, respectively, separated by a sharp edge 35. Shown in FIG. 7b, is a corresponding output signal 36 produced by the video camera and whose edge is distorted.

By analyzing the edge 37, the Modular Transfer Function (MTF) of the electro-optical system may be calculated, in accordance with the equations:

$$LSF_{(x)} = \frac{d}{dx} (Edge_{(x)}) \quad (5)$$

$$MTF_{(v)} = \mathscr{F}\{LSF_{(v)}\} \quad (6)$$

where LSF represents the Line Spread Function being the differential of the edge 37.

Figure 8A:
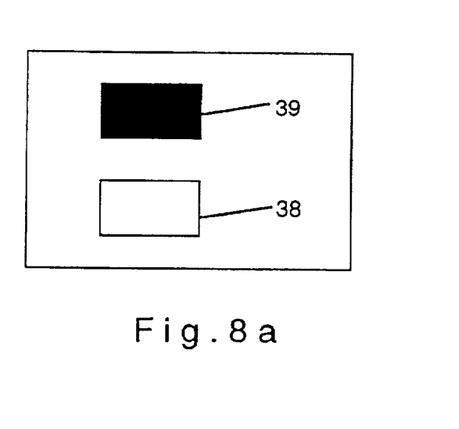
FIGS. 8a and 8b are schematic representations showing, respectively, a detail of a reticle and a corresponding output signal for determining a Signal-to-Noise ratio for the system.
Figure 8B:
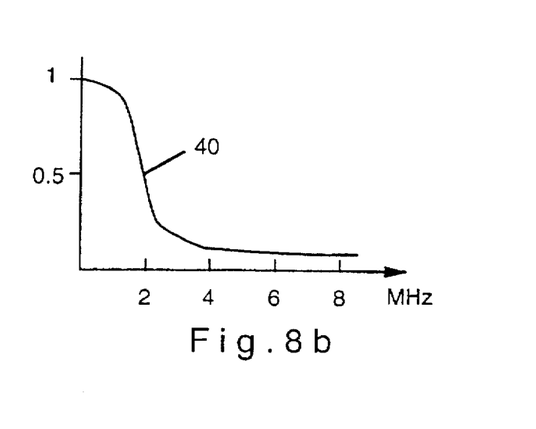

FIG. 8a shows schematically, an area of the reticle 22 having thereon transparent and opaque areas 38 and 39, respectively. As explained above with reference to FIG. 6a of the drawings, the relative responses produced by each of these areas should theoretically be 100% and 0%, respectively. In fact, noise will inevitably be superimposed on the output signal. Shown in FIG. 8b, is a weighting function 40 for correcting the noise level as a function of frequency, so as to compensate for the fact that the human eye reacts less to high frequency noise signals than to noise signals of relatively low frequency.

By analyzing the correcting noise signal, the Signal-to-Noise ratio of the electro-optical system may be calculated, in accordance with the equations:

$$SNR = 20 \log \left( \frac{700 \, mV}{N} \right)$$

$$N_{(t)} = Sig_{(t)} - Ave(Sig_{(t)}) \quad (8)$$
$$N = RMS\{N_{(t)}\} \quad (9)$$
$$S_{(\omega)} = \mathscr{F}\{N(t)\}$$
$$S_\omega \cdot A_{(\omega)} = \mathscr{F}\{N_{(t)}\} \cdot A_{(\omega)} \quad (10)$$
$$N_{(weighted)} = \mathscr{F}\{S_{(\omega)} \cdot A_{(\omega)}\}$$

where Equation (9) relates to regular noise denoted by N and Equation (10) relates to weighted noise.

Figure 9A:
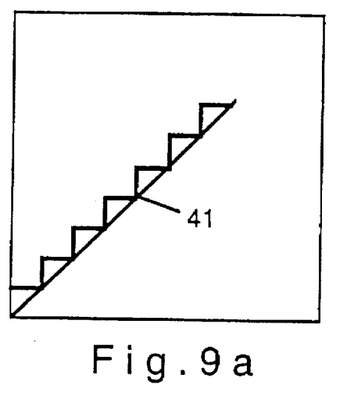
FIGS. 9a and 9b are schematic representations showing, respectively, a detail of a reticle and a corresponding output signal for testing the system for Grey level linearity.

FIG. 9a shows schematically, an area of the reticle 22 having thereon a plurality of different grey level regions 41 having a linear gradation in transmittance. Ideally the output signal 42 shown in FIG. 9b will also be linear but, in practice, this is not the case.

Figure 9B:
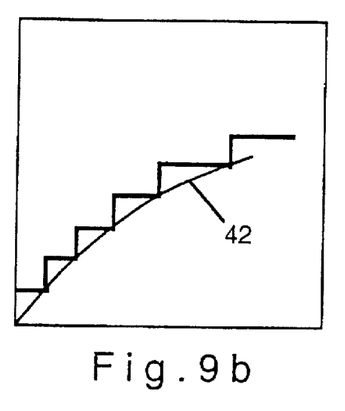

By analyzing the non-linearity of the output signal 42, the Grey Level Linearity of the electro-optical system may be calculated.

Figure 10A:
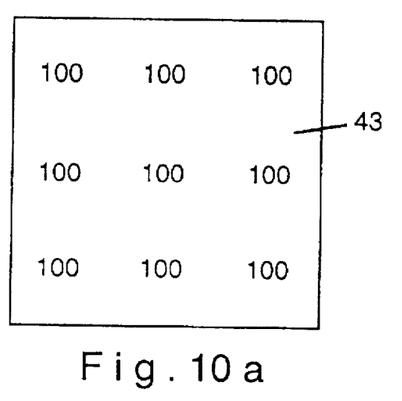
FIGS. 10a and 10b are schematic representations showing, respectively, a detail of a reticle and a corresponding output signal for testing the system for vignetting.
Figure 10B:
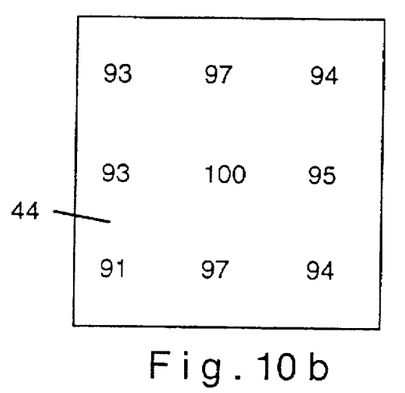

FIG. 10a shows schematically a uniform light function 43 applied through the complete area of the reticle 22. As shown in FIG. 10b, owing to vignetting, the output signal 44 at the edges and corners is somewhat less than the input signal 43. By analyzing the fall off of the output signal 44 at the edges and corners, the effect of vignetting can be evaluated.

Figure 11:
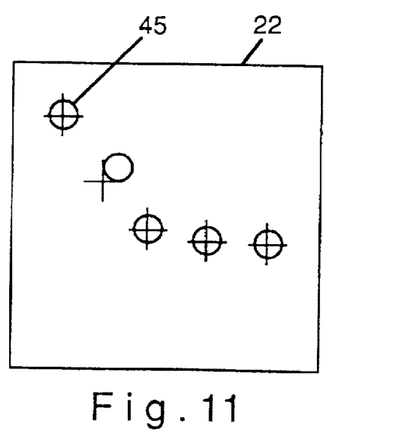
FIG. 11 is a schematic representation showing a detail of a reticle and a corresponding output signal for testing the system for distortion.

FIG. 11 shows schematically a detail of the reticle 22 having thereon at known pre-calibrated locations a plurality of input points 45 denoted by crosses. Superimposed thereon is a like plurality of output points 46 denoted by circles which are not exactly coincident with the crosses 45 owing to distortion through the reticle 22. Distortion may be evaluated by normalizing the actual positions of the output points 46 according to their expected positions.

Figure 12:
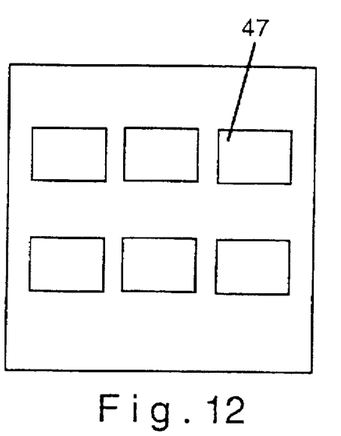
FIG. 12 is schematic representation showing a detail of a reticle and a corresponding output signal for testing the system for chromaticity.

FIG. 12 shows schematically a detail of the reticle 22 having thereon a color chart denoted .generally by 47 and comprising a plurality of different colored regions. Each colored region is formed of a known, pre-calibbrated mix of primary colors e.g. Red (20%), Green (35%) and Blue (45%). The color mix of the corresponding region of the display device (constituted by a color monitor) is evaluated, and any deviation from the pre-calibrated color mix is measured in order to establish the chromaticity of the color monitor.

Figure 13A:
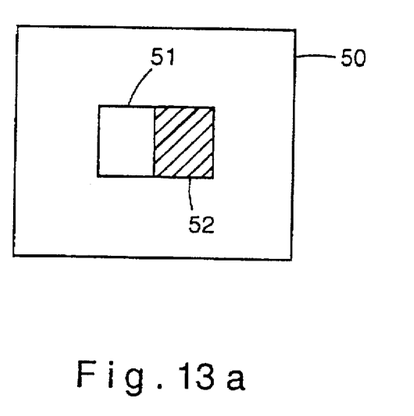
FIGS. 13a and 13b are schematic representations showing, respectively, a detail of a reticle and a corresponding output signal for testing the system for transients.

FIG. 13a shows a detail of a reticle for determining the transient response of an electro-optical system due to a sudden increase in light flux. The reticle 50 contains a transparent white area 51 for transmitting light therethrough adjacent to a black area 52 which is nominally opaque to light. The black area 52 is used for calibration purposes so as to determine the relative transmittance of the transparent area 51. Light having an intensity $L_1$ is passed through the transparent area 51 of the reticle 50 at a time $t=t_1-\epsilon$ and is illuminated by light having an intensity $L_2$ at a time $t=t_1+\epsilon$ where $\epsilon$ is a short time interval.

Figure 13B:
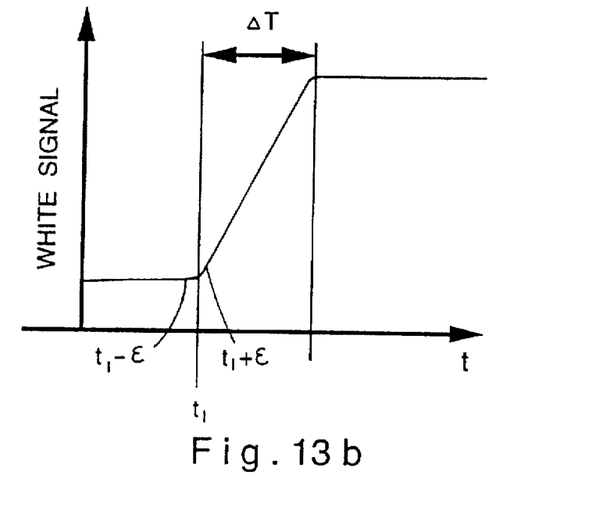

FIG. 13b shows graphically the transient response of the reticle 50 wherein the transient time response $\Delta T$ is the time interval between the two steady state levels of light flux $L_1$ and $L_2$, respectively.

Figure 14A:
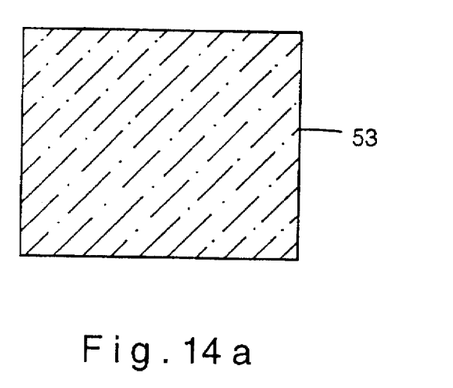
FIGS. 14a and 14b are schematic representations showing, respectively, a detail of a reticle and a corresponding output signal for testing the system for blemishes.
Figure 14B:
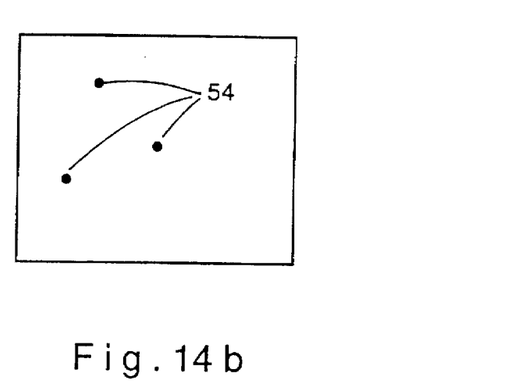

FIG. 14a shows a nominally homogeneous target 53 which provides details of blemishes in the detector, including their location, contrast and characteristics. The homogeneous target 53 is scanned in order to produce what would, ideally, be a homogeneous image free of blemishes. In practice, owing to blemishes in the detector, blemishes 54 are produced in the image, whose location, contrast and characteristics may be quantified.

Figure 15A:
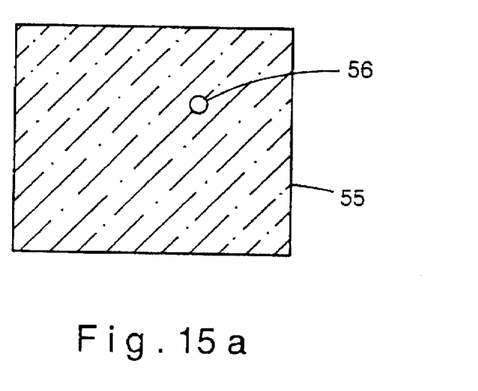
FIGS. 15a and 15b are schematic representations showing, respectively, a detail of a reticle and a corresponding output signal for testing the system for blooming.
Figure 15B:
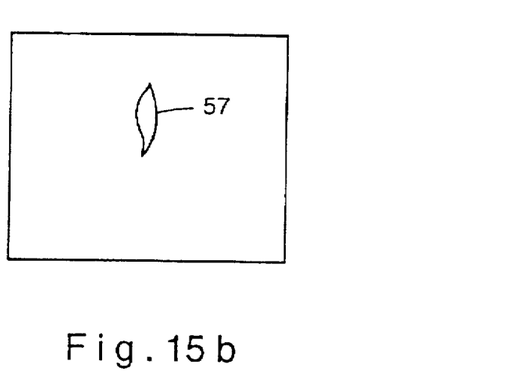

FIG. 15 shows a dark target 55 having bright (i.e. transparent) spots 56 at predetermined locations thereof used for the determination of blooming. An image 57 is produced wherein, owing to smear and blooming effects, the bright spots 56 are elongated. The extent of elongation or smear characterizes the quality of the electro-optical system and is termed "blooming". The actual quantity of blooming is determined in accordance with the following formula:

$$B = \frac{E_{smear}}{E_{Total}} \qquad (11)$$

$$E_{total} = E_{source} + E_{smear}$$

where:

B is the amount of blooming in the image, $E_{total}$ is the total energy, $E_{smear}$ is the energy of the smear, and $E_{source}$ is the energy of the source.

Thus, there is zero blooming if $E_{smear}$ is zero and blooming approaches one as $E_{smear}$ approaches infinity.

It will be appreciated that the invention is equally well adapted for determining other parameters associated with an electro-optical system not specifically detailed above.

I claim:

1. A method for testing the performance of at least one electro-optical test device, comprising the steps of:

(a) selecting a plurality of electro-optical devices including a light source, a test target, a lens and an imaging means to construct an electro-optical system which consists of the plurality of electro-optical devices;

(b) selecting at least one electro-optical device of the electro-optical system to be an electro-optical test device;

(c) defining all the other electro-optical devices of the electro-optical system that have not been selected as electro-optical test devices as pro-calibrated devices of the system;

(d) creating a database for storing a respective identity code of a plurality of different types of pro-calibrated devices including said pre-calibrated devices of the system together with corresponding electro-optical performances, (e) aligning the imaging means to the test target so as to produce a focused image thereof, (f) digitizing and storing the focussed image so as to produce a digitized image, (g) analyzing the digitized image so as to determine an electro-optical performance representative of the performance of the electro-optical system and being equal to the product of component electro-optical performances of each of said at least one electro-optical test device and each of said pre-calibbrated devices, (h) accessing the database in order to extract the electro-optical performances of each of the electro-optical devices in the electro-optical system, and (i) determining the product of component electro-optical performances of each of said at least one electro-optical test device.

2. The method according to claim 1, wherein:

said at least one electro-optical test device is selected from a group comprising light source, lens, target, camera, and the target includes at least one test area constructed to permit measurement of said electro-optical performance.

3. The method according to claim 1, wherein:

said at least one electro-optical test device is a display device, and the light source and target are an electronically generated test signal constructed to permit measurement of said electro-optical performance.

4. The method according to claim 1, wherein said electro-optical performance is representative of:

(a) Modular Transfer Function,
(b) Contrast Transfer Function,
(c) Grey Level Linearity,
(d) Illumination Uniformity,
(e) Geometrical Distortion,
(f) Signal to Noise Ratio,
(g) Transient Response,
(h) Blemishes,
(i) Blooming, and
(j) Chromaticity.

5. A system for testing the performance of at least one electro-optical test device, the system comprising:

an electro-optical system including said at least one electro-optical test device coupled to pre-calibrated devices, said electro-optical system comprising a light source, a target, a lens and an imaging means, a computer coupled to the electro-optical system and including a memory for storing therein a database of pre-calibrated device identity codes and corresponding electro-optical performances thereof in respect of a plurality of different types of pre-calibrated electro-optical device including said pre-calibrated devices, optical alignment means coupled to the electro-optical system and to the computer for permitting alignment of the electro-optical system and producing an indication signal when the electro-optical system is correctly aligned, a setup means for specifying the identity codes of each of the pre-calibbrated devices in said electro-optical system, a digitizing means coupled to the electro-optical system for digitizing an image produced by the electro-optical system and being coupled to said memory for storing therein a corresponding digitized image, an analysis means coupled to the memory for determining an electro-optical performance representative of the performance of the electro-optical system and being equal to the product of component electro-optical performances of each of said at least one electro-optical test device and each of said pre-calibrated devices, said analysis means further for extracting from the database the electro-optical performances of each of the pre-calibrated devices and for determining the product of component electro-optical performances of each of said at least one electro-optical test device.

6. The system according to claim 5, wherein:

said at least one electro-optical test device is selected from a group comprising light source, lens, target, camera, and the target includes at least one test area constructed to permit measurement of said electro-optical performance.

7. The system according to claim 5, wherein:

said at least one electro-optical test device is a display device, and the light source and target are an electronically generated test signal constructed to permit measurement of said electro-optical performance.

8. The system according to claim 5, wherein said electro-optical performance is representative of:

(a) Modular Transfer Function,
(b) Contrast Transfer Function,
(c) Grey Level Linearity,
(d) Illumination Uniformity,
(e) Geometrical Distortion,
(f) Signal to Noise Ratio,
(g) Transient Response,
(h) Blemishes,
(i) Blooming, and
(j) Chromaticity.

9. The system according to claim 6, wherein:

the target includes a high accuracy pre-calibrated reticle for forming an image by said at least one electro-optical test device, and the analysis unit analyzes said image so as to determine the combined optical performance of the at least one test device.

10. The system according to claim 9, wherein the reticle is provided with at least two discrete patterns thereon each for producing respective test images whereby corresponding functions of the electro-optical device can be tested simultaneously.

11. The system according to claim 9, wherein the reticle is provided with a shaping edge pattern for determining the Modular Transfer Function of the electro-optical device.

12. The system according to claim 9, wherein each pattern on the reticle is repeated in different areas of the reticle in order to permit spatial variation in the performance of the optical component to be determined.

13. For use in the system according to claim 5, a high accuracy pre-calibbrated reticle for forming an image of at least one test pattern by an optical device whose optical performance is to be determined.

14. The reticle according to claim 13, wherein there are provided thereon at least two discrete test patterns each for producing respective test images, whereby corresponding functions of the optical components can be tested simultaneously.

15. The reticle according to claim 13, wherein there is provided a shaping edge pattern for determining the Modular Transfer Function of the optical component.

16. The reticle according to claim 13, wherein each said at least one test pattern is repeated in different areas of the reticle in order to permit spatial variation in the performance of the optical component to be determined.

* * * * *